United States Patent [19]

Kaiya et al.

[11] Patent Number: 5,545,682

[45] Date of Patent: Aug. 13, 1996

[54] SILICONE COMPOSITIONS FOR THE FORMATION OF CURED RELEASE COATINGS

[75] Inventors: Nobuo Kaiya; Hideki Kobayashi, both of Chiba, Japan

[73] Assignee: Dow Corning Silicone Co., Ltd., Tokyo, Japan

[21] Appl. No.: 447,663

[22] Filed: May 23, 1995

[30] Foreign Application Priority Data

May 31, 1994 [JP] Japan .................................. 6-141209

[51] Int. Cl.$^6$ ...................................................... C08K 5/54
[52] U.S. Cl. ...................... 524/265; 524/267; 524/266; 525/477; 525/478; 525/479; 528/15; 528/18; 528/19; 528/24
[58] Field of Search ................................. 528/15, 18, 24, 528/19; 525/477, 478, 479; 524/265, 267, 266

[56] References Cited

U.S. PATENT DOCUMENTS

| | | | |
|---|---|---|---|
| 3,527,659 | 9/1970 | Keil | 117/145 |
| 4,123,604 | 10/1978 | Sanford, Jr. | 528/31 |
| 5,334,688 | 8/1994 | Loo | 528/15 |

FOREIGN PATENT DOCUMENTS

| | | | |
|---|---|---|---|
| 0108208 | 5/1984 | European Pat. Off. | |
| 0493841 | 12/1991 | European Pat. Off. | C08L 83/14 |
| 0652257 | 11/1994 | European Pat. Off. | C08L 83/07 |

*Primary Examiner*—Melvyn I. Marquis
*Attorney, Agent, or Firm*—Sharon K. Severance

[57] ABSTRACT

The introduction of release coating-forming silicone compositions that yield cured release coatings that exhibit excellent release properties against tacky substances and do not impair the residual adhesion of tacky substances.

Silicone composition for the formation of cured release coatings, that characteristically comprises (A) 100 weight parts of a cured coating-forming silicone composition into which there is admixed
(B) 0.5 to 500 weight parts organosilicon polymer with the following average unit formula

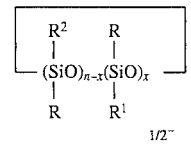

wherein R represents $C_1$ to $C_{10}$ monovalent hydrocarbon groups that are free of aliphatic unsaturation; $R^1$ represents organic groups selected from the group consisting essentially of $C_2$ to $C_{20}$ alkylene groups and organic groups with the formulas $-R^3(OR^3)_y-$ and $-R^3-(R_2SiO)_zR_2Si-R^3-$ (R is defined as above, $R^3$ denotes $C_2$ to $C_{20}$ alkylene groups, which may be the same or different, y is an integer with a value of 1 or more, and z is zero or an integer with a value of 1 or more); $R^2$ represents groups selected from the group consisting essentially of $C_1$ to $C_{10}$ monovalent hydrocarbon groups, the hydrogen atom, $C_1$ to $C_{10}$ alkoxy groups, and the hydroxyl group; n=3 to 20; x=1 to 13; and n≥x.

25 Claims, No Drawings

SILICONE COMPOSITIONS FOR THE FORMATION OF CURED RELEASE COATINGS

BACKGROUND OF THE INVENTION

The use of certain organopolysiloxane-based silicone release compositions to form release coatings on the surface of various substrates is known in the art. These substrates include paper, cardboard, laminated paper, synthetic resin films, fabrics, synthetic fibers, metal foils, and the like. Cured coatings capable of releasing a variety of tacky substances are formed by coating the surface of the substrate with an organopolysiloxane-based silicone release composition and thereafter curing the composition.

One drawback generally associated with dimethylpolysiloxane-based silicone release compositions is the very light release resistance of the coatings afforded by their cure. This has made it necessary to add a controlled-release additive to these compositions with the goal of adjusting the release resistance of their cured coatings. These controlled-release additives are exemplified by MQ silicone copolymers comprised of $R'_3SiO_{3/2}$ and $SiO_{4/2}$ units wherein R' represents monovalent hydrocarbon groups having no more than 2 carbons as set forth in U.S. Pat. No. 3,527,659 and European Patent No. 0108208 and by MQ silicone copolymers comprised of the $R'SiO_{1/2}$, $(CH_2=CH)R'_2SiO_{1/2}$, and $SiO_{4/2}$ units wherein R' represents monovalent hydrocarbon groups having no more than 2 carbons as set forth in Canadian Patent No. 1064640.

Unfortunately, silicone release compositions containing the above-described MQ silicone copolymers as a controlled-release additive suffer from a large migration of silicone component into the tacky substance, which results in a substantial decline in the residual adhesion of the tacky substance. Another problem arises from the fact that the above-described MQ silicone copolymers are generally solids at room temperature. As a consequence, the silicone release compositions that contain these MQ silicone copolymers have an elevated viscosity, which degrades their coatability on the surface of various substrates.

It is an object of the present invention the introduction of silicone release compositions that yield cured release coatings that exhibit excellent release properties against tacky substances without impairing the residual adhesion of said tacky substances.

SUMMARY OF THE INVENTION

The present invention relates to silicone compositions that form cured release coatings (hereinafter referred to as silicone release compositions). More particularly, the present invention relates to silicone release compositions that produce cured release coatings that exhibit excellent release properties against tacky substances without impairing the residual adhesion of said tacky substances.

The silicone release compositions of the instant invention comprise (A) 100 weight parts of a cured coating-forming silicone composition into which there is admixed (B) 0.5 to 500 weight parts organosilicon polymer with the following average unit formula

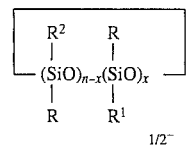

wherein each R independently is a $C_1$ to $C_{10}$ monovalent hydrocarbon groups that is free of aliphatic unsaturation;

$R^1$ is an organic group selected from the group consisting essentially of $C_2$ to $C_{20}$ alkylene groups, organic groups with the formula $—R^3(OR^3)_y—$ where each $R^3$ is independently a $C_2$ to $C_{20}$ alkylene group and y is an integer with a value of 1 or more, and organic groups with the formula $—R^3—(R_2SiO)_zR_2Si—R^3—$ where R and $R^3$ are defined as above and z is zero an integer with a value of 1 or more;

$R^2$ is selected from the group consisting essentially of $C_1$ to $C_{10}$ monovalent hydrocarbon groups, the hydrogen atom, $C_1$ to $C_{10}$ alkoxy groups, and the hydroxyl group;

n is an integer with a value of at least 3 but no greater than 20;

x is an integer with a value of at least 1 but no greater than 13; and $n \geq x$.

The silicone release compositions according to the present invention are explained in detail hereinafter.

THE INVENTION

Component (A) used in the present invention are cured coating-forming silicone compositions that cure to give silicone coatings capable of releasing various tacky substances. The nature of this composition is not critical, and those already known in the art may be used. Component (A) may be exemplified by, but not limited to, addition reaction-curing cured coating-forming silicone compositions, condensation reaction-curing cured coating-forming silicone compositions, organoperoxide-curing cured coating-forming silicone compositions, and cured coating-forming silicone compositions that are cured by exposure to high-energy radiation, such as ultraviolet radiation, electron beams, and others. Preferred among these cured coating-forming silicone compositions are addition reaction-curing and condensation reaction-curing compositions.

Preferred for the addition reaction-curing compositions are compositions comprising (a) 100 weight parts of an organopolysiloxane that contains at least 2 alkenyl groups in each molecule and that has a viscosity at 25° C. of at least 40 centipoise, (b) 0.5 to 90 weight parts of an organohydrogenpolysiloxane that contains at least 3 silicon-bonded hydrogen atoms in each molecule and that has a viscosity at 25° C. of 1 to 1,000 centipoise, and (c) a platinum catalyst, in a quantity that provides 0.1 to 1,000 weight parts platinum metal for each 1,000,000 weight parts of the combined amount of components (a) and (b).

The organopolysiloxane (a) in useful in the addition reaction-curing composition must have a viscosity at 25° C. of at least 40 centipoise and must contain at least 2 alkenyl groups in each molecule. Component (a) may be exemplified by an organopolysiloxane with the average unit formula $R^4_aSiO_{4-a/2}$ where $R^4$ is a monovalent hydrocarbon group and subscript a has a value of 1.95 to 2.05. $R^4$ may be exemplified by, but not limited to, alkyl groups such as methyl, ethyl, propyl and butyl; alkenyl groups such as vinyl, allyl, butenyl, pentenyl and hexenyl; aryl groups such as phenyl, tolyl and xylyl; aralkyl groups such as benzyl and phenethyl; and haloalkyl groups such as 3-chloropropyl and 3,3,3-trifluoropropyl. $R^4$ is preferably methyl. The molecular structure of component (a) is not critical and may be exemplified by straight chain, cyclic, network, and partially branched straight chain. Straight-chain structures are preferred. The endblocking groups for the molecular chain may be exemplified by, but not limited to, trimethylsiloxy, dimethylvinylsiloxy, dimethylphenylsiloxy, and dimethylhydroxysiloxy. Component (a) must have a viscosity at 25° C. of at least 40 centipoise, while the upper viscosity limit for this component is formed by and includes the viscosity of the corresponding gums. When component (a) has a viscosity less than 40 centipoise too much of the resulting silicone release composition will permeate into the substrate. When the silicone release composition is to be used as a solvent-free formulation, the viscosity of component (a) at 25° C. preferably ranges from 40 to 10,000 centipoise and more preferably ranges from 100 to 5,000 centipoise. When the silicone release composition is to be used as a solvent-based formulation, the viscosity of component (a) at 25° C. preferably ranges from 100,000 centipoise up to that of gums and more preferably ranges from 500,000 centipoise up to that of gums.

Organopolysiloxane (a) may be further exemplified by the following:

dimethylvinylsiloxy-endblocked dimethylpolysiloxanes, dimethylvinylsiloxy-endblocked dimethylsiloxanemethylvinylsiloxane copolymers, dimethylvinylsiloxy-endblocked dimethylsiloxanemethylphenylsiloxane copolymers, trimethylsiloxy-endblocked methylvinylpolysiloxanes, trimethylsiloxy-endblocked dimethylsiloxanemethylvinylsiloxane copolymers, trimethylsiloxy-endblocked dimethylsiloxane-methyl(5-hexenyl)siloxane copolymers, dimethylvinylsiloxy-endblocked dimethylsiloxanemethylvinylsiloxane-methylphenylsiloxane copolymers, dimethylhydroxysiloxy-endblocked methylvinylpolysiloxanes, and dimethylhydroxysiloxy-endblocked dimethylsiloxanemethylvinylsiloxane copolymers.

The organohydrogenpolysiloxane (b) in the addition reaction-curing composition functions as a crosslinker, and it must have a viscosity at 25° C. of 1 to 1,000 centipoise and must contain at least 3 silicon-bonded hydrogen atoms in each molecule. Component (b) may be exemplified by an organohydrogenpolysiloxane with the average unit formula $R^5_b SiO_{(4-b)/2}$ where $R^5$ is selected from the group consisting of the hydrogen atom and monovalent hydrocarbon groups excluding alkenyl groups and subscript b ranges from 1.5 to 3.0. $R^5$ may be exemplified by, but not limited to, the hydrogen atom; alkyl groups such as methyl, ethyl, propyl and butyl; aryl groups such as phenyl, tolyl and xylyl; aralkyl groups such as benzyl and phenethyl; and haloalkyl groups such as 3-chloropropyl and 3,3,3-trifluoropropyl. Methyl is preferred when $R^5$ is a monovalent hydrocarbon group. The molecular structure of component (b) is not critical and may be exemplified by straight chain, cyclic, network, and partially branched straight chain. Straight-chain structures are preferred. The endblocking groups for the molecular chain may be exemplified by, but not limited to, trimethylsiloxy, dimethylphenylsiloxy, dimethylhydrogensiloxy, and dimethylhydroxysiloxy. The viscosity of component (b) at 25° C. must fall in the range from 1 to 1,000 centipoise and preferably ranges from 5 to 500 centipoise. When component (b) has a viscosity less than 1 centipoise, it volatilizes so readily that the composition of the resulting silicone release composition will be unstable. When component (b) has a viscosity greater than 1,000 centipoise it causes such problems such as a lengthy cure time for the resulting silicone release composition and a reduced releasability for the ultimately obtained cured release coating.

Component (b) may be exemplified by, but limited to, the following:

trimethylsiloxy-endblocked methylhydrogenpolysiloxanes, trimethylsiloxy-endblocked dimethylsiloxanemethylhydrogensiloxane copolymers, dimethylhydrogensiloxy-endblocked dimethylpolysiloxanes, dimethylhydrogensiloxy-endblocked dimethylsiloxanemethylhydrogensiloxane copolymers, methylhydrogensiloxane cyclics, and cyclic methylhydrogensiloxane-dimethylsiloxane copolymers.

Component (b) is added at 0.5 to 90 weight parts per 100 weight parts component (a), and is preferably added at 1 to 80 weight parts per 100 weight parts component (a). The cure of the resulting silicone release composition will be unacceptable when component (b) is added at less than 0.5 weight part per 100 weight parts component (a), while additions in excess of 90 weight parts cause a reduced releasability on the part of the ultimately obtained cured release coating.

The platinum catalyst (c) in the addition reaction-curing composition functions to cure the composition by accelerating the addition reaction between components (a) and (b). Component (c) may be exemplified by, but not limited to, chloroplatinic acid, alcohol solutions of chloroplatinic acid, chloroplatinic acid/olefin complexes, chloroplatinic acid/vinylsiloxane complexes, chloroplatinic acid/ketone complexes, platinum supported on alumina micropowder, platinum supported on silica micropowder, and platinum black. Component (c) should be added in a quantity that provides 0.1 to 1,000 weight parts platinum metal for each 1,000,000 weight parts of the combined quantity of components (a) and (b).

The addition reaction-curing composition is essentially comprised of the components (a)–(c) described above, but they may also contain an addition-reaction inhibitor for the purpose of providing the composition with storage stability at room temperature. Said addition-reaction inhibitors may be exemplified by, but not limited to, alkynyl alcohols such as 3-methyl-1-butyn-3-ol, 3,5-dimethyl-1-hexyn-3-ol, 3-methyl-1-pentyn-3-ol and phenylbutynol; and by 3-methyl-3-penten-1-yne, 3,5-dimethyl-1-hexyn-3-ene, benzotriazole, and methylvinylsiloxane cyclics. The addition-reaction inhibitor may be added in any desired quantity, but generally will be used in the range of 0.001 to 5 weight parts per 100 weight parts component (a).

Preferred for the condensation reaction-curing compositions are compositions comprising (a') 100 weight parts of an organopolysiloxane that contains at least 2 silanol groups in each molecule and that has a viscosity at 25° C. of at least 40 centipoise, (b') 0.5 to 90 weight parts of an organohydrogenpolysiloxane that contains at least 2 silicon-bonded hydrogen atoms in each molecule and that has a viscosity at 25° C. of 1 to 1,000 centipoise, and (c') 0.01 to 20 weight parts of a metal salt of an organic acid.

The organopolysiloxane (a') in the condensation reaction-curing cured coating-forming silicone composition must have a viscosity at 25° C. of at least 40 centipoise and must contain at least 2 silanol groups in each molecule. Component (a') may be exemplified by and organopolysiloxane with the average unit formula $R^6_c SiO_{(4-c)/2}$ where $R^6$ is selected from the group consisting of a monovalent hydrocarbon group and the hydroxyl group; and subscript c has a value of 1.95 to 2.05. In $R^6$ the monovalent hydrocarbon groups may be exemplified by, but not limited to, alkyl groups such as methyl, ethyl, propyl and butyl; alkenyl groups such as vinyl, allyl, butenyl, pentenyl and hexenyl; aryl groups such as phenyl, tolyl and xylyl; aralkyl groups such as benzyl and phenethyl; and haloalkyl groups such as 3-chloropropyl and 3,3,3-trifluoropropyl. Methyl is preferred monovalent hydrocarbon group. The molecular structure of component (a') is not critical and may be exemplified by straight chain, cyclic, network, and partially branched straight chain. Straight-chain structures are preferred. The endblocking groups for the molecular chain may be exemplified by, but not limited to, dimethylhydroxysiloxy and methylphenylhydroxysiloxy. Component (a') must have a viscosity at 25° C. of at least 40 centipoise, while the upper viscosity limit for this component is formed by and includes the viscosity of the corresponding gums. Too much of the resulting silicone release composition will permeate into the substrate when component (a') has a viscosity less than 40 centipoise. When the silicone release composition is to be used as a solvent-free formulation, the viscosity of component (a') at 25° C. preferably ranges from 40 to 10,000 centipoise and more preferably ranges from 100 to 5,000 centipoise. When the silicone release composition is to be used as a solvent-based formulation, the viscosity of component (a') at 25° C. preferably ranges from 100,000 centipoise up to that of gums and more preferably ranges from 500,000 centipoise up to that of gums.

Component (a') may be further exemplified by the following:

dimethylhydroxysiloxy-endblocked dimethylpolysiloxanes, dimethylhydroxysiloxy-endblocked dimethylsiloxanemethylvinylsiloxane copolymers, dimethylhydroxysiloxy-endblocked dimethylsiloxanemethylphenylsiloxane copolymers, dimethylhydroxysiloxy-endblocked methylvinylpolysiloxanes, dimethylhydrxysiloxy -endblocked dimethylsiloxane-methylphenylpolysiloxane copolymers, dimethylhydroxysiloxy-endblocked dimethylsiloxane-methyl(5-hexenyl)siloxane copolymers, and dimethylhydroxysiloxy-endblocked methylphenylpolysiloxanes.

The organohydrogenpolysiloxane (b') in the condensation reaction-curing cured coating-forming silicone composition functions as a crosslinker. Organohydrogenpolysiloxane (b') must have a viscosity at 25° C. of 1 to 1,000 centipoise and must contain at least 2 silicon-bonded hydrogen atoms in each molecule. Component (b') may be exemplified by an organohydrogenpolysiloxane with the average unit formula $R^7_d SiO_{(4-d)/2}$ where $R^7$ is selected from the group consisting of the hydrogen atom and monovalent hydrocarbon groups and subscript d ranges from 1.5 to 3.0. Said $R^7$ monovalent hydrocarbon groups are exemplified by alkyl groups such as methyl, ethyl, propyl and butyl; alkenyl groups such as vinyl, allyl, butenyl, pentenyl and hexenyl; aryl groups such as phenyl, tolyl and xylyl; aralkyl groups such as benzyl and phenethyl; and haloalkyl groups such as 3-chloropropyl and 3,3,3-trifluoropropyl. Methyl is preferred among the monovalent hydrocarbon groups. The molecular structure of component (b') is not critical and may be exemplified by straight chain, cyclic, network, and partially branched straight chain. Straight-chain structures are preferred. The endblocking groups for the molecular chain may be exemplified by, but not limited to trimethylsiloxy, dimethylphenylsiloxy, dimethylhydrogensiloxy, and dimethylhydroxysiloxy. The viscosity of component (b') at 25° C. must fall in the range from 1 to 1,000 centipoise and preferably ranges from 5 to 500 centipoise. When component (b') has a viscosity less than 1 centipoise, it volatilizes so readily that the composition of the resulting silicone release composition will be unstable. When component (b') has a viscosity greater than 1,000 centipoise it causes such problems as a lengthy cure time for the resulting silicone release composition and a reduced releasability for the ultimately obtained cured release coating.

Organohydrogenpolysiloxane (b') may be further exemplified by the following:

trimethylsiloxy-endblocked methylhydrogenpolysiloxanes, trimethylsiloxy-endblocked dimethylsiloxanemethylhydrogensiloxane copolymers, dimethylhydrogensiloxy-endblocked dimethylpolysiloxanes, dimethylhydrogensiloxy-endblocked dimethylsiloxanemethylhydrogensiloxane copolymers, methylhydrogensiloxane cyclics, and cyclic methylhydrogensiloxane-dimethylsiloxane copolymers.

Component (b') is added at 0.5 to 90 weight parts per 100 weight parts component (a'), and is preferably added at 1 to 80 weight parts per 100 weight parts component (a'). The cure of the resulting silicone release composition will be unacceptable when component (b') is added at less than 0.5 weight part per 100 weight parts component (a'). Additions in excess of 90 weight parts (b') will cause a reduced releasability on the part of the ultimately obtained cured release coating.

The metal salt of organic acid comprising component (c') in subject condensation reaction-curing cured coating-forming silicone composition functions to cure the composition by accelerating the condensation reaction between components (a') and (b'). Component (c') may be exemplified by dibutyltin diacetate, dibutyltin dioctoate, dibutyltin dilaurate, dioctyltin dilaurate, tin octoate, zinc naphthoate, and iron octoate. Component (c') is added at 0.01 to 20 weight parts per 100 weight parts component (a').

The cured coating-forming silicone composition (A) may contain the following, for example, on an optional basis: filler such as silica micropowder and the like, organic solvent, adhesion promoter, colorant, and pigment. The use of an organic solvent is preferred because it improves the storage stability of the silicone release composition and improves substrate coatability. No specific limitation applies to organic solvent useable in the present invention as long as it is capable of the homogeneous dissolution of the cured coating-forming silicone composition. Organic solvents useable in the present invention may be exemplified by, but not limited to, aromatic hydrocarbons such as benzene, toluene and xylene; aliphatic hydrocarbons such as pentane, hexane and heptane; halogenated hydrocarbons such as trichloroethylene, perchloroethylene, trifluoromethylbenzene, 1,3-bis-(trifluoromethyl)benzene and methylpentafluorobenzene; and by ethyl acetate and methyl ethyl ketone. The general range of addition for the organic solvent is 0 to 10,000 weight parts per 100 weight parts component (A).

The silicone release compositions according to the present invention also comprise (B) an organosilicon polymer with the following average unit formula

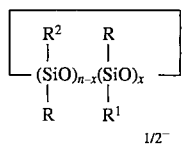

admixed with the cured coating-forming silicone composition (A). This organosilicon polymer, which functions as a controlled-release additive, imparts an optimal release resistance to the cured release coatings produced by the cure of the cured coating-forming silicone compositions into which it is blended. Component (B) also functions to inhibit silicone component migration into the tacky substance and thereby prevents the residual adhesion of the tacky substance from declining.

R in the preceding formula for organosilicon polymer (B) is a $C_1$ to $C_{10}$ monovalent hydrocarbon group that is free of aliphatic unsaturation and may be exemplified by, but not limited to, alkyl groups such as methyl, ethyl, propyl, butyl, pentyl and octyl; aryl groups such as phenyl, tolyl and xylyl; aralkyl groups such as benzyl and phenethyl and haloalkyl groups such as 3-chloropropyl and 3,3,3-trifluoropropyl. R is preferably methyl.

$R^1$ is selected from the group consisting essentially of $C_2$ to $C_{20}$ alkylene groups, organic groups with the formula $—R^3(OR^3)_y—$, and organic groups with the formula $—R^3—R_2SiO)_zR_2Si—R^3—$. Said $C_2$ to $C_{20}$ alkylene groups may be exemplified by ethylene, propylene, butylene, pentylene, hexylene, and octylene. $R^3$ in the organic group $—R^3(OR^3)_y—$ represents $C_2$ to $C_{20}$ alkylene groups, which may be the same or may differ, while y in this formula is an integer with a value of at least 1. This organic group may be exemplified by $—C_3H_6OC_3H_6—$ and $—C_3H_6(OC_2H_4)_6OC_3H_6—$. The R and $R^3$ in the organic group $—R^3—(R_2SiO)_zR_2Si—R^3—$ are the same as above, while z in this formula is zero or an integer with a value of 1 or more. This organic group may be exemplified by the following $—C_2H_4—Me_2Si—C_2H_4—$, $—C_2H_4—Me_2SiOMe_2Si—C_2H_4—$, and $—C_6H_{12}—Me_2SiOMe_2Si—C_6H_{12}—$ where Me represents methyl.

$R^2$ is selected from the group consisting essentially of $C_1$ to $C_{10}$ monovalent hydrocarbon groups, the hydrogen atom, $C_1$ to $C_{10}$ alkoxy groups, and the hydroxyl group. The $C_1$ to $C_{10}$ monovalent hydrocarbon groups may be exemplified by the groups listed above for R and also by alkenyl groups such as vinyl, allyl, butenyl, pentenyl, hexenyl, and octenyl. The $C_1$ to $C_{10}$ alkoxy groups may be exemplified by methoxy, ethoxy, propoxy, and butoxy. $R^2$ is preferably hydrogen or alkenyl when (A) is an addition reaction-curing composition. $R^2$ is preferably hydrogen, hydroxyl, or $C_1$ to $C_{10}$ alkoxy when (A) is a condensation reaction-curing composition.

The subscript n is an integer with a value of at least 3 but no more than 20; the subscript x is a number with a value of at least 1 but no more than 13; and n≧x.

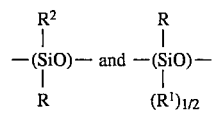

siloxane unites in organosilicon polymer (B) may be arranged in an alternating pattern, randomly, or in a block pattern. With regard to the corresponding stereostructure, a mixture of optical isomers may be present or optical activity may be exhibited. The weight-average molecular weight of organosilicon polymer (B) is preferably at least 1,000. There are no particular limitations on the viscosity (25° C.) of organosilicon polymer (B), but the viscosity range of 10 to 10,000 centistokes is preferred due to the corresponding excellent handling characteristics of the silicone release composition and excellent releasability of the ultimately obtained cured release coating. The organosilicon polymer (B) is generally soluble in organic solvents such as toluene, xylene, and others. Because organosilicon polymer (B) does not raise the viscosity of the silicone release compositions, it is highly adapted in particular for use as a controlled-release additive for solvent-free silicone release compositions.

The organosilicon polymer (B) may be exemplified by straight-chain organosilicon polymers whose main chains are comprised of repeat unit(s) with the following formula

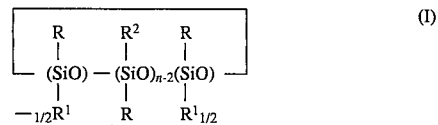

and whose terminals are selected from groups with the following formula (II)

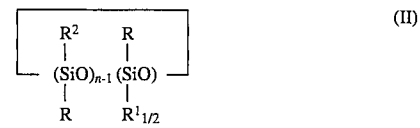

and by organosilicon polymers whose main chains are comprised of units with the following formula (III)

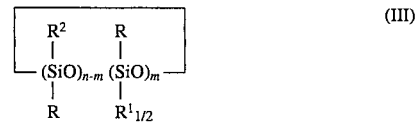

and whose terminals are selected from groups with the preceding formula (II) with the proviso in the case of this latter organosilicon polymer that it contains in each molecule at least one (III) unit in which m is at least 3. The R, $R^1$, $R^2$, and n in the preceding formulas are as defined as above. The subscript m is an integer with a value of at least 2 but no more than 13; however, there must be at least one m which is an integer with a value of at least 3 since there must be at least one (III) unit in each molecule in which m is at least 3.

Organosilicon polymer (B) may be exemplified by the polymers below, in which Me=methyl, Et=ethyl, and Vi=vinyl:

an organosilicon polymer whose main chain is comprised of a repeat unit with the formula

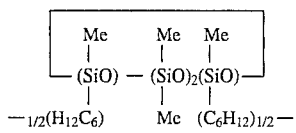

and whose terminals are groups with the following formula

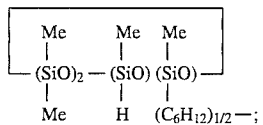

an organosilicon polymer whose main chain is comprised of units with the following formulas

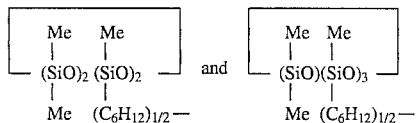

and whose terminals are groups with the following formula

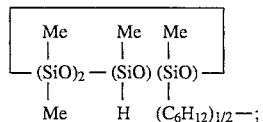

an organosilicon polymer whose main chain is comprised of units with the following formulas

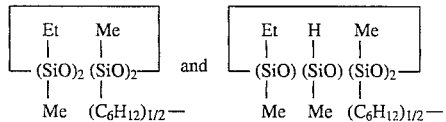

and whose terminals are groups with the following formula

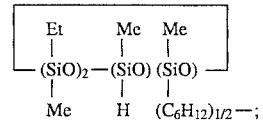

an organosilicon polymer whose main chain is comprised of units with the following formulas

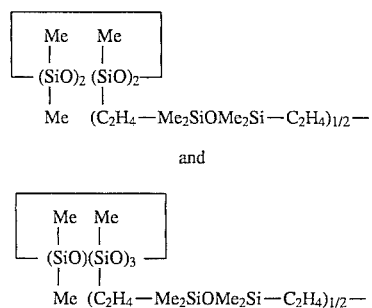

and whose terminals are groups with the following formula

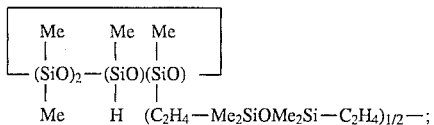

an organosilicon polymer whose main chain is comprised of a repeat unit with the formula

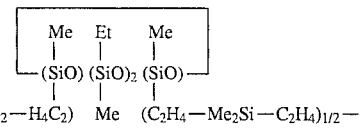

and whose terminals are groups with the formula

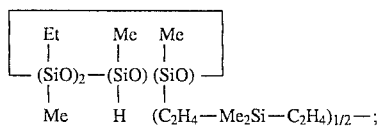

an organosilicon polymer with the formula

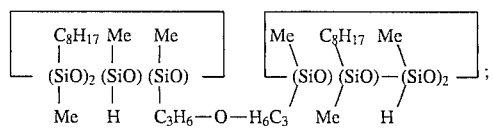

an organosilicon polymer whose main chain is comprised of a repeat unit with the formula

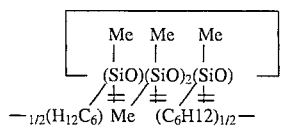

and whose terminals are groups with the formula

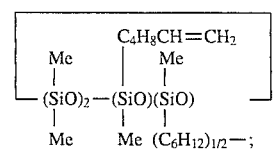

organosilicon polymer whose main chad is comprised of units with the formulas

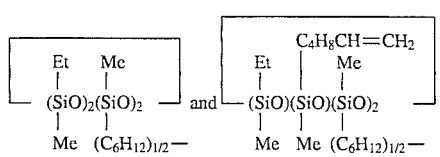

and whose terminals are groups with the formula

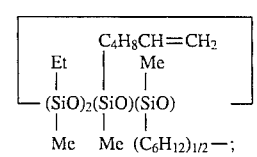

an organosilicon polymer whose main chain is comprised of a repeat unit with the formula

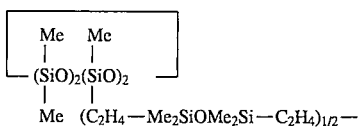

and whose terminals are groups with the formula

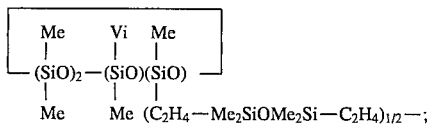

organosilicon polymer whose main chain is comprised of a repeat unit with the formula

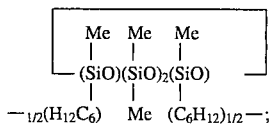

and whose terminals are groups with the formula

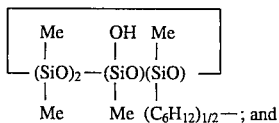

an organosilicon polymer whose main chain is comprised of units with the formulas

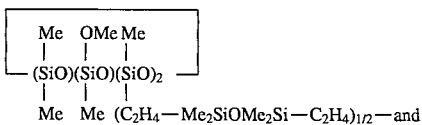

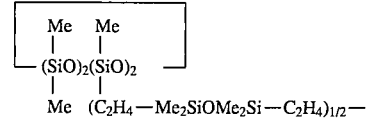

and whose terminals are groups with the formula

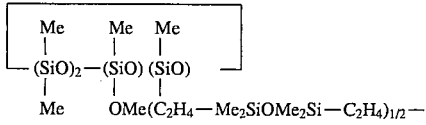

The method for preparing organosilicon polymer (B) is not critical. One method, for example, consists of running an addition polymerization between (i) cyclic siloxanes with the following general formulas

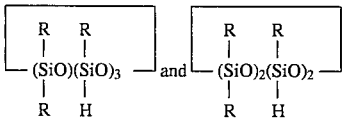

where R is a $C_1$ to $C_{10}$ monovalent hydrocarbon group that is free of aliphatic unsaturation and (ii) a compound selected from the group consisting essentially of $C_3$ to $C_{20}$ unsaturated aliphatic hydrocarbons that contain 2 carbon-carbon double bonds, $C_2$ to $C_{20}$ unsaturated aliphatic hydrocarbons that contain 1 carbon-carbon triple bond, compounds with the formula $R^8(OR^3)_qOR^8$ where $R^3$ is defined as above, $R^8$ is a $C_2$ to $C_{20}$ alkenyl group, and g is zero or an integer with a value of at least 1, and organosilicon compounds with the formula $R^8(R_2SiO)_rR_2SiR^8$ where R and $R^8$ are defined as above, and r is zero or an integer with a value of at least 1; in the presence of (iii) hydrosilylation reaction catalyst.

When it is desired to synthesize straight-chain organosilicon polymer whose main chain is comprised of formula (I) units, component (i) must be a cyclic siloxane that contains two SiH-bearing siloxane units. When it is desired to synthesize organosilicon polymer whose main chain is comprised of formula (III) units, component (i) must then contain at least one cyclic siloxane molecule that contains at least 3 SiH-bearing siloxane units. Any unreacted SiH remaining in the organosilicon polymer thus obtained can be easily converted into alkoxy or hydroxyl.

Organosilicon polymer (B) is added in the range of 0.5 to 500 weight parts per 100 weight parts (A). The release resistance of the corresponding cured release coating will be too light when less than 0.5 weight part component (B) is added, while the cured release coating will present a very heavy release resistance when more than 500 weight parts is added. When component (A) is either an addition reaction-curing or a condensation reaction-curing composition, component (B) is preferably added at 1.0 to 500 weight parts per 100 weight parts component (A) and is more preferably added at 2.0 to 200 weight parts.

The silicone release composition according to the present invention can be prepared by adding organosilicon polymer (B) to component (A) either during or after preparation of the cured coating-forming silicone composition (A). While no specific restrictions apply to the conditions for curing the silicone release composition according to the present invention, the cured release coating is preferably produced at temperatures ranging from 50° C. to 200° C.

The silicone release composition according to the present invention has the ability to form cured release coatings that exhibit an optimal release resistance against a variety of tacky substances. These optimized cured release coatings can be formed on the surface of such substrates as paper, cardboard, laminated paper, synthetic resin films, fabrics and textiles, synthetic fibers, metal foils, and the like. Substrates bearing these cured release coatings can be used for process paper, asphalt-lining paper, tapes, labels, and others. Moreover, use of a relatively low-viscosity organosilicon polymer (B) in the silicone release composition according to the present invention makes possible the preparation and application of solvent-free formulations of said silicone release composition.

So that those skilled in the art can understand and appreciate the invention taught herein, the following examples are presented, it being understood that these examples should not be used to limit the scope of this invention found in the claims attached hereto. The values reported for the viscosity in the examples were measured at 25° C., while Me and Et are abbreviations for methyl and ethyl, respectively. The release resistance of the cured release coatings and the residual adhesion by tacky substance were measured by the following methods.

Measurement of the release resistance of the cured release coatings

The silicone release composition was coated at approximately 1.0 g/m² on polyethylene-laminated kraft paper, and a cured release coating was then produced by heating in a forced circulation oven for 30 seconds at 160° C. An acrylic-based pressure-sensitive adhesive (Oribine BPS8170, from Toyo Ink Mfg. Company, Limited) was coated on the resulting cured release coating followed by heating for 3 minutes at 75° C. in a forced circulation oven. A 25-micrometer polyethylene terephthalate film was subsequently applied to the acrylic-based pressure-sensitive adhesive, and the assembly was then held at 22° C./60% humidity under a load of 20 gf/cm². A 5-cm wide strip was thereafter cut from the backing paper, and the release resistance (gf) was measured by peeling the backing paper strip at 180° using a Tensilon tester.

Residual adhesion by tacky substance

The silicone release composition was coated at approximately 1.0 g/m² on polyethylene-laminated kraft paper, and a cured release coating was then produced by heating in a forced circulation oven for 35 seconds at 160° C. Polyester tape (Polyester Tape 31B from Nitto Denko Company) was applied to the cured release coating, and the assembly was heated for 20 hours at 60° C. under a load of 20 gf/cm². The polyester tape was thereafter peeled off and applied to a stainless steel sheet. The peel resistance f (gf) was measured by peeling the polyester tape at 180° using a Tensilon tester. In the blank experiment, the game type of polyester tape as before was applied to a sheet of Teflon instead of the cured release coating. This polyester tape was then peeled at 180° using a Tensilon tester to give the reference peel resistance $f_0$ (gf) for the polyester tape. The percentage (%) calculated from the peel resistance f using the reference peel resistance $f_0$ as the basis is reported as the residual adhesion of tacky substance.

EXAMPLE 1

The following were mixed to homogeneity: 100 weight parts dimethylvinylsiloxy-endblocked dimethylsiloxanemethylvinylsiloxane copolymer (vinyl content=0.81 weight %, viscosity=520 centipoise), 3 weight parts trimethylsiloxy-endblocked methylhydrogensiloxane (viscosity=20 centipoise), 0.9 weight part methylbutynol, and 18 weight parts of an organosilicon polymer (viscosity=140 centipoise) whose main chain was comprised of a repeat unit with the following formula

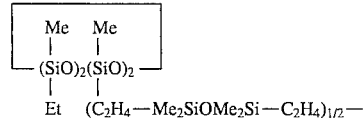

and whose terminals are groups with the following formula

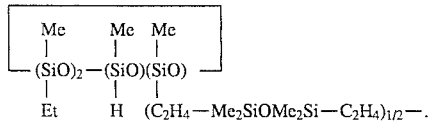

A solvent-free silicone release composition was then prepared by the addition, with mixing to homogeneity, of sufficient isopropanolic chloroplatinic acid solution to provide 190 ppm platinum from the chloroplatinic acid based on the aforementioned dimethylsiloxane-methylvinylsiloxane copolymer. The release resistance and residual adhesion of tacky substance was measured on the cured silicone release coating. These results are reported in Table 1.

Comparative Example 1

A silicone release composition with a viscosity of 2,000 centipoise was prepared according to the procedure in Example 1, except 64 weight parts silicone copolymer powder with the average unit formula

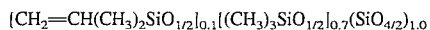

$[CH_2=CH(CH_3)_2SiO_{1/2}]_{0.1}[(CH_3)_3SiO_{1/2}]_{0.7}(SiO_{4/2})_{1.0}$ was used in place of the 18 weight parts organosilicon polymer that was used in Example 1. The release resistance and residual adhesion of tacky substance was measured on the cured silicone release coating. These results are reported in Table 1.

EXAMPLE 2

A silicone release composition was prepared by mixing the following to homogeneity: 100 weight parts silanol-endblocked dimethylpolysiloxane gum, 7.1 weight parts trimethylsiloxy-endblocked methylhydrogensiloxane with a viscosity of 10 centipoise, 17 weight parts of the same organosilicon copolymer as used in Example 1 (this organosilicon copolymer was soluble in toluene), 5 weight parts dibutyltin diacetate, and 1,350 weight parts toluene. The release resistance and residual adhesion of tacky substance was measured on the cured silicone release coating. These results are reported in Table 1.

Comparative Example 2

The procedure of Example 2 was followed to prepare a silicone release composition, but in this case without using the organosilicon polymer that was used in Example 2. The release resistance and residual adhesion of tacky substance was measured on the cured silicone release coating. These results are reported in Table 1.

Comparative Example 3

The procedure of Example 2 was followed to prepare a silicone release composition, but in this case using silicone copolymer powder with the average unit formula

$[CH_2=CH(CH_3)_2SiO_{1/2}]_{0.1}[(CH_3)_3SiO_{1/2}]_{0.7}(SiO_{4/2})_{1.0}$ in place of the organosilicon polymer that was used in Example 2. The release resistance and residual adhesion of tacky substance was measured on the cured silicone release coating. These results are reported in Table 1.

TABLE 1

|  | Example 1 | Example 2 | Comp. Ex. 1 | Comp. Ex. 2 | Comp. Ex. 3 |
|---|---|---|---|---|---|
| Release Resistance (gf/5 cm) | 120 | 100 | 56 | 22 | 44 |
| Residual Adhesion (%) | 99 | 94 | 77 | 94 | 74 |

EXAMPLE 3

The following were mixed to homogeneity: 100 weight parts trimethylsiloxy-endblocked dimethylsiloxane-methylvinylsiloxane copolymer gum (vinyl content=0.91 weight %), 2 weight parts trimethylsiloxy-endblocked methylhydrogensiloxane with a viscosity of 10 centipoise, 0.9 weight part 3,5-dimethyl-3-hexen-1-yne, 2,000 weight parts toluene, and 17 weight parts of a toluene-soluble organosilicon polymer (viscosity=80 centipoise, silicon-bonded hydrogen content=0.2 weight %) comprised of units (k: l=1:2) with the formulas

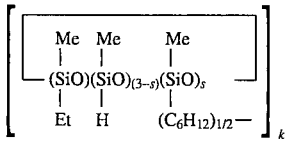

where s is 1, 2, and 3 and

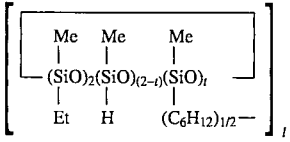

where t is 1 and 2.

A silicone release composition was then prepared by the addition, with mixing to homogeneity, of sufficient isopropanolic chloroplatinic acid solution to provide 100 ppm platinum from the chloroplatinic acid based on the aforementioned dimethylsiloxanemethylvinylsiloxane copolymer. The release resistance and residual adhesion of tacky substance was measured on the cured silicone release coating. These results are reported in Table 2.

Comparative Example 4

The procedure of Example 3 was followed to prepare a silicone release composition, but in this case omitting the organosilicon polymer and changing the addition of the trimethylsiloxy-endblocked methylhydrogensiloxane used in Example 3 to 3.1 weight parts. The release resistance and residual adhesion of tacky substance was measured on the cured silicone release coating. These results are reported in Table 2.

TABLE 2

|  | Example 3 | Comparative Example 4 |
|---|---|---|
| Release Resistance (gf/5 cm) | 90 | 24 |
| Residual Adhesion (%) | 99 | 99 |

Because the silicone release composition according to the present invention comprises organosilicon polymer (B), it is characteristically able to form cured release coatings that exhibit excellent release characteristics against tacky substances without reducing the residual adhesion of the tacky substance.

What is claimed is:

1. A silicone composition for the formation of cured release coatings, wherein said composition comprises
   (A) 100 weight parts of a cured coating-forming silicone composition selected from the group consisting of addition reaction-curing cured coating-forming silicone compositions, condensation reaction-curing cured coating-forming silicone compositions, organoperoxide-curing cured coating-forming silicone compositions, and cured coating-forming silicone compositions that are cured by exposure to high-energy radiation into which there is admixed
   (B) 0.5 to 500 weight parts organosilicon polymer having a viscosity of 10 to 10,000 centistokes with the following average unit formula

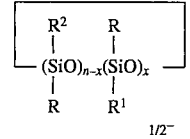

wherein each R is independently a $C_1$ to $C_{10}$ monovalent hydrocarbon group that is free of aliphatic unsaturation;

$R^1$ is an organic group selected from the group consisting of $C_2$ to $C_{20}$ alkylene groups, organic groups with the formula —$R^3(OR^3)_y$— where each $R^3$ is independently a $C_2$ to $C_{20}$ alkylene group and y is an integer with a value of 1 or more, and organic groups with the formula —$R^3$—$(R_2SiO)_zR_2Si$—$R^3$— where R and $R^3$ are defined as above and z is an integer with a value of 1 or more;

$R^2$ is selected from the group consisting of $C_1$ to $C_{10}$ monovalent hydrocarbon groups, the hydrogen atom, $C_1$ to $C_{10}$ alkoxy groups, and the hydroxyl group;

n is an integer with a value of at least 3 but no greater than 20;

x is an integer with a value of at least 1 but no greater than 13; and $n \geq x$.

2. A silicone composition as claimed in claim 1 wherein there is 2 to 200 parts (B) per 100 parts of (A).

3. A silicone composition as claimed in claim 1 wherein component (B) is straight-chain organosilicon polymer whose main chain is comprised of repeat unit(s) with the following formula

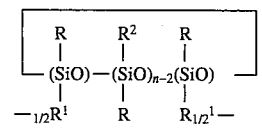

and whose terminals are selected from groups with the following formula

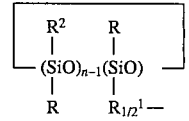

wherein each R is independently selected from a $C_1$ to $C_{10}$ monovalent hydrocarbon group that is free of aliphatic unsaturation;

$R^1$ is an organic group selected from the group consisting essentially of $C_2$ to $C_{20}$ alkylene groups, organic groups with the formula —$R^3(OR^3)_y$— where each $R^3$ is independently a $C_2$ to $C_{20}$ alkylene group and Y is an integer with a value of 1 or more, and organic groups with the formula —$R^3$—$(R_2SiO)_zR_2Si$—$R^3$— where R and $R^3$ are defined as above and z is zero or an integer with a value of 1 or more;

$R^2$ is selected from the group consisting essentially of $C_1$ to $C_{10}$ monovalent hydrocarbon groups, the hydrogen atom, $C_1$ to $C_{10}$ alkoxy groups, and the hydroxyl group; and n is an integer with a value of at least 3 but no greater than 20.

4. A silicone composition as claimed in claim 1 wherein component (B) is organosilicon polymer whose main chain is comprised of units with the following formula

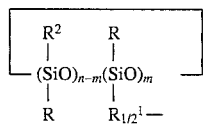

and whose terminals are selected from groups with the following formula

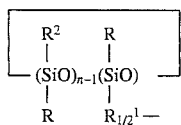

wherein each R is independently selected from a $C_1$ to $C_{10}$ monovalent hydrocarbon group that is free of aliphatic unsaturation;

$R^1$ is an organic group selected from the group consisting essentially of $C_2$ to $C_{20}$ alkylene groups, organic groups with the formula $—R^3(OR^3)_y—$ where each $R^3$ is independently a $C_2$ to $C_{20}$ alkylene group and y is an integer with a value of 1 or more, and organic groups with the formula $—R^3—(R_2SiO)_zR_2Si—R^3—$ where R and $R^3$ are defined as above and z is zero or an integer with a value of 1 or more;

$R^2$ is selected from the group consisting essentially of $C_1$ to $C_{10}$ monovalent hydrocarbon groups, the hydrogen atom, $C_1$ to $C_{10}$ alkoxy groups, and the hydroxyl group; and n is an integer with a value of at least 3 but no greater than 20 m is an integer with a value of at least 2 but no greater than 13; and n ≧ m;

with the proviso that the organosilicon polymer contains in each molecule at least one

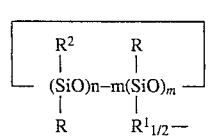

unit in which m is at least 3.

5. A silicone composition as claimed in claim 3 wherein in the organosilicon polymer the repeat unit is of the formula

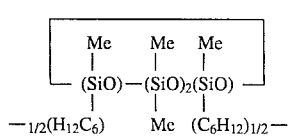

and the terminals are groups with the formula

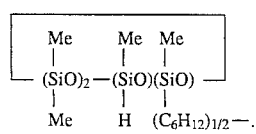

6. A silicone composition as claimed in claim 4 wherein in the organosilicon polymer the repeat unit is of the formulas

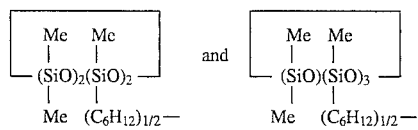

and the terminals are groups with the formula

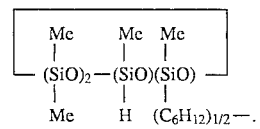

7. A silicone composition as claimed in claim 1 wherein in the organosilicon polymer the repeat unit is of the formulas

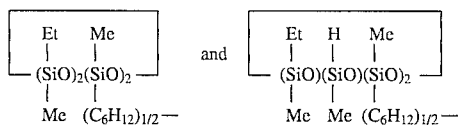

and the terminals are groups with the formula

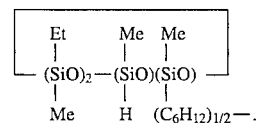

8. A silicone composition as claimed in claim 4 wherein in the organosilicon polymer the repeat unit is of the formulas

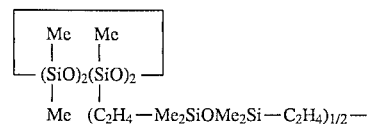

and

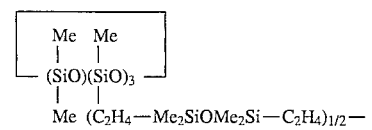

and the terminals are groups with the formula

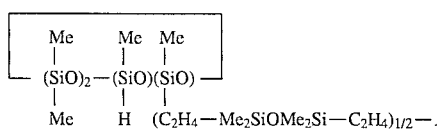

9. A silicone composition as claimed in claim 1 wherein in the organosilicon polymer is of the formula

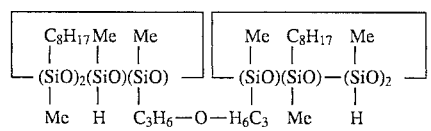

10. A silicone composition as claimed in claim 3 wherein in the organosilicon polymer the repeat unit is of the formula

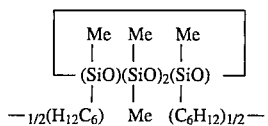

and the terminals are groups of the formula

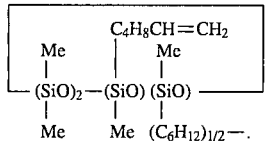

11. A silicone composition as claimed in claim 1 wherein in the organosilicon polymer the repeat unit is of the formulas

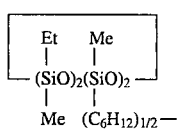 and 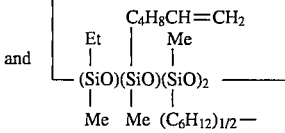

and the terminals are groups of the formula

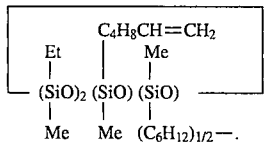

12. A silicone composition as claimed in claim 1 wherein in the organolsilicon polymer the repeat unit is of the formula

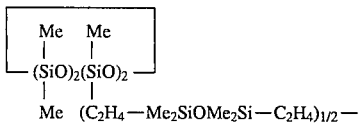

and the terminals are groups with the formula

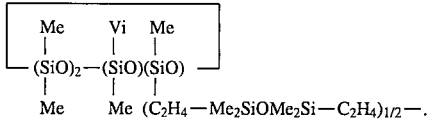

13. A silicone composition as claimed in claim 3 wherein in the organosilicon polymer the repeat unit is of the formula

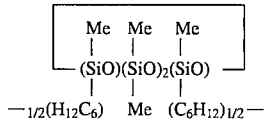

and the terminals are groups with the formula

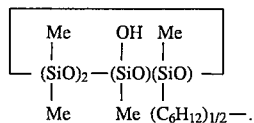

14. A silicone composition as claimed in claim 1 wherein in the organolisicon polymer the repeat unit is of the formulas

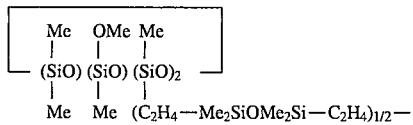

and

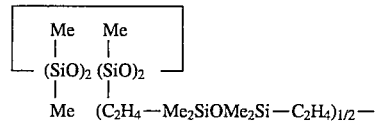

and the terminals are groups with the formula

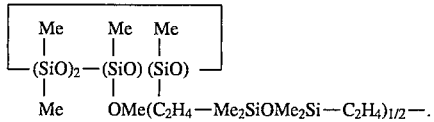

15. A silicone composition as claimed in claim 1 wherein component (A) is an addition reaction-curing cured coating-forming silicone composition.

16. A silicone composition as claimed in claim 15 wherein addition reaction-curing cured coating-forming silicone composition comprises (a) 100 weight parts organopolysiloxane that contains at least 2 alkenyl groups in each molecule and that has a viscosity at 25° C. of at least 40 centipoise, (b) 0.5 to 90 weight parts organohydrogenpolysiloxane that contains at least 3 silicon-bonded hydrogen atoms in each molecule and that has a viscosity at 25° C. of 1 to 1,000 centipoise, and (c) platinum catalyst, in a quantity that provides 0.1 to 1,000 weight parts platinum metal for each 1,000,000 weight parts of the combined amount of components (a) and (b).

17. A silicone composition as claimed in claim 16 wherein the organopolysiloxane (a) is an organopolysiloxane with the average unit formula formula $R^4_a SiO_{(4-a)/2}$ where $R^4$ is a monovalent hydrocarbon group and subscript a has a value of 1.95 to 2.05 and containing endblocking groups selected from the group consisting of trimethylsiloxy, dimethylvinylsiloxy, dimethylphenylsiloxy, and dimethylhydroxysiloxy.

18. A silicone composition as claimed in claim 16 wherein the organohydrogenpolysiloxane (b) is an organohydrogenpolysiloxane with the average unit formula $R^5_b SiO_{(4-b)/2}$ where $R^5$ is selected from the group consisting of the hydrogen atom and monovalent hydrocarbon groups excluding alkenyl groups and subscript b ranges from 1.5 to 3.0 and containing endblocking groups selected from the group consisting of trimethylsiloxy, dimethylphenylsiloxy, dimethylhydrogensiloxy, and dimethylhydroxysiloxy.

19. A silicone composition as claimed in claim 16 wherein the platinum catalyst is selected from the group consisting of chloroplatinic acid, alcohol solutions of chloroplatinic acid, chloroplatinic acid/olefin complexes, chloroplatinic acid/vinylsiloxane complexes, chloroplatinic acid/ketone complexes, platinum supported on alumina micropowder, platinum supported on silica micropowder, and platinum black.

20. The silicone composition as claimed in claim 16 wherein there is additionally present in the addition reaction-curing cured coating-forming silicone composition a addition-reaction inhibitor.

21. A silicone composition as claimed in claim 1 wherein component (A) is a condensation reaction-curing cured coating-forming silicone composition.

22. A silicone composition as claimed in claim 21 wherein the condensation reaction-curing cured coating-forming silicone composition comprises (a') 100 weight parts organopolysiloxane that contains at least 2 silanol groups in each molecule and that has a viscosity at 25° C. of at least 40 centipoise, (b') 0.5 to 90 weight parts organohydrogenpolysiloxane that contains at least 2 silicon-bonded hydrogen atoms in each molecule and that has a viscosity at 25° C. of 1 to 1,000 centipoise, and (c') 0.01 to 20 weight parts metal salt of an organic acid.

23. A silicone composition as claimed in claim 22 wherein the organopolysiloxane (a') is an organopolysiloxane with the average unit formula $R^6_c SiO_{(4-c)/2}$ where $R^6$ is selected from the group consisting of a monovalent hydrocarbon group and the hydroxyl group and subscript c has a value of 1.95 to 2.05 and contains endblocking groups selected from the group consisting of dimethylhydroxysiloxy and methylphenylhydroxysiloxy.

24. A silicone composition as claimed in claim 22 wherein the organohydrogenpolysiloxane (b') is selected from an organohydrogenpolysiloxane with the average unit formula $R^7_d SiO_{(4-d)/2}$ where $R^7$ is selected from the group consisting of the hydrogen atom and monovalent hydrocarbon groups and subscript d ranges from 1.5 to 3.0 and containing endblocking groups selected from the group consisting of trimethylsiloxy, dimethylphenylsiloxy, dimethylhydrogensiloxy, and dimethylhydroxysiloxy.

25. A silicone composition as claimed in claim 22 wherein the metal salt of organic acid is selected from the group consisting of dibutyltin diacetate, dibutyltin dioctoate, dibutyltin dilaurate, dioctyltin dilaurate, tin octoate, zinc naphthoate, and iron octoate.

* * * * *